US012407734B2

(12) United States Patent
Israel et al.

(10) Patent No.: US 12,407,734 B2
(45) Date of Patent: Sep. 2, 2025

(54) AUTONOMOUS NETWORK POLICY GENERATOR (71) Applicant: CHECK POINT SOFTWARE TECHNOLOGIES LTD., Tel Aviv (IL)

(72) Inventors: Erez Israel, Tel Aviv (IL); Lior Goldman, Raanana (IL); Natan Katz, Tel Aviv (IL)

(73) Assignee: CHECK POINT SOFTWARE TECHNOLOGIES LTD., Tel Aviv (IL)

( * ) Notice: Subject to any disclaimer, the term of this patent is extended or adjusted under 35 U.S.C. 154(b) by 105 days.

(21) Appl. No.: 18/401,547

(22) Filed: Dec. 31, 2023

(65) Prior Publication Data

US 2025/0220049 A1 Jul. 3, 2025

(51) Int. Cl.
*G06F 21/57* (2013.01)
*H04L 9/40* (2022.01)
(52) U.S. Cl.
CPC .................... *H04L 63/20* (2013.01)
(58) Field of Classification Search
None
See application file for complete search history.

(56) References Cited

U.S. PATENT DOCUMENTS

| 2022/0053015 | A1* | 2/2022 | Jones | G06F 21/577 |
| 2023/0090205 | A1* | 3/2023 | Yehezkel | H04L 63/1425 |
| | | | | 726/23 |
| 2023/0239204 | A1* | 7/2023 | Hayrapetyan | H04L 41/0893 |
| | | | | 709/221 |

* cited by examiner

*Primary Examiner* — Fatoumata Traore
(74) *Attorney, Agent, or Firm* — Renner, Otto, Boisselle & Sklar, LLP (57) ABSTRACT

A device, system, and method are provided for generating a network security policy automatically based on network traffic. The network security policy is generated by building a directional graph from the network traffic, with the nodes of the graph representing network end points, and the edges representing communication between two nodes on a communication channel. A feature vector is generated for each of the nodes and a graph neural network is applied to the feature vectors to generate output vectors. The output vectors are clustered using a cost function based on a weighted combination of a distance-based cost function and a network functionality cost function. The clusters generated from the output vectors are used to assign network security rules to each of the clusters.

20 Claims, 3 Drawing Sheets

FIG. 4

AUTONOMOUS NETWORK POLICY GENERATOR

TECHNICAL FIELD

The present disclosure relates generally to computer security and more particularly to generating a network policy.

BACKGROUND

The configuration and maintenance of security policies (e.g., firewall policies) plays an important role in safeguarding the digital assets of companies and organizations. These policies are used to segment and direct network traffic to prevent unauthorized access through the network.

With the advent of cloud computing, mobile computing, and the Internet of Things (IoT), traffic within networks has become more complex. This complexity makes it challenging to develop security policies that are both comprehensive and adaptable. Traditional approaches often result in policies that are either overly restrictive (i.e., impeding legitimate network traffic) or too lenient (i.e., leaving vulnerabilities unaddressed).

The manual configuration of these policies is not only time-consuming but also prone to human error. Network administrators must meticulously specify which traffic is allowed or blocked based on numerous parameters such as IP addresses, URLs, port numbers, and protocols. Any misconfiguration can lead to security breaches or network disruptions. Furthermore, as the organization grows and its network evolves, maintaining and updating these policies becomes increasingly burdensome.

SUMMARY

The present disclosure provides a method, computer device, and system for generating a network security policy by clustering network end points using an embedding of a directional graph of network communications between the network end points.

While a number of features are described herein with respect to embodiments of the invention; features described with respect to a given embodiment also may be employed in connection with other embodiments. The following description and the annexed drawings set forth certain illustrative embodiments of the invention. These embodiments are indicative, however, of but a few of the many ways in which the principles of the invention may be employed. Other objects, advantages, and novel features according to aspects of the invention will become apparent from the following detailed description when considered in conjunction with the drawings.

BRIEF DESCRIPTION OF THE DRAWINGS

The annexed drawings, which are not necessarily to scale, show various aspects of the invention in which similar reference numerals are used to indicate the same or similar parts in the various views.

The present invention is described below in detail with reference to the drawings. In the drawings, each element with a reference number is similar to other elements with the same reference number independent of any letter designation following the reference number. In the text, a reference number with a specific letter designation following the reference number refers to the specific element with the number and letter designation and a reference number without a specific letter designation refers to all elements with the same reference number independent of any letter designation following the reference number in the drawings.

DETAILED DESCRIPTION

The present disclosure provides a device, system and method for generating a network security policy automatically based on network traffic. The network security policy is generated by building a directional multigraph from the network traffic, with the nodes of the graph representing network end points, and the edges representing communication between two nodes on a communication channel. A feature vector is generated for each of the nodes and a graph neural network is applied to the feature vectors to generate output vectors. The output vectors are clustered using a cost function based on a weighted combination of a distance-based cost function and a network functionality cost function. The weights of the cost functions are altered using a weight setting function. The clusters generated from the output vectors are used to assign network security rules to each of the clusters such that the nodes included in each of the clusters are permitted to perform the network communications included in the network data for the nodes included in the cluster.

Figure 1:
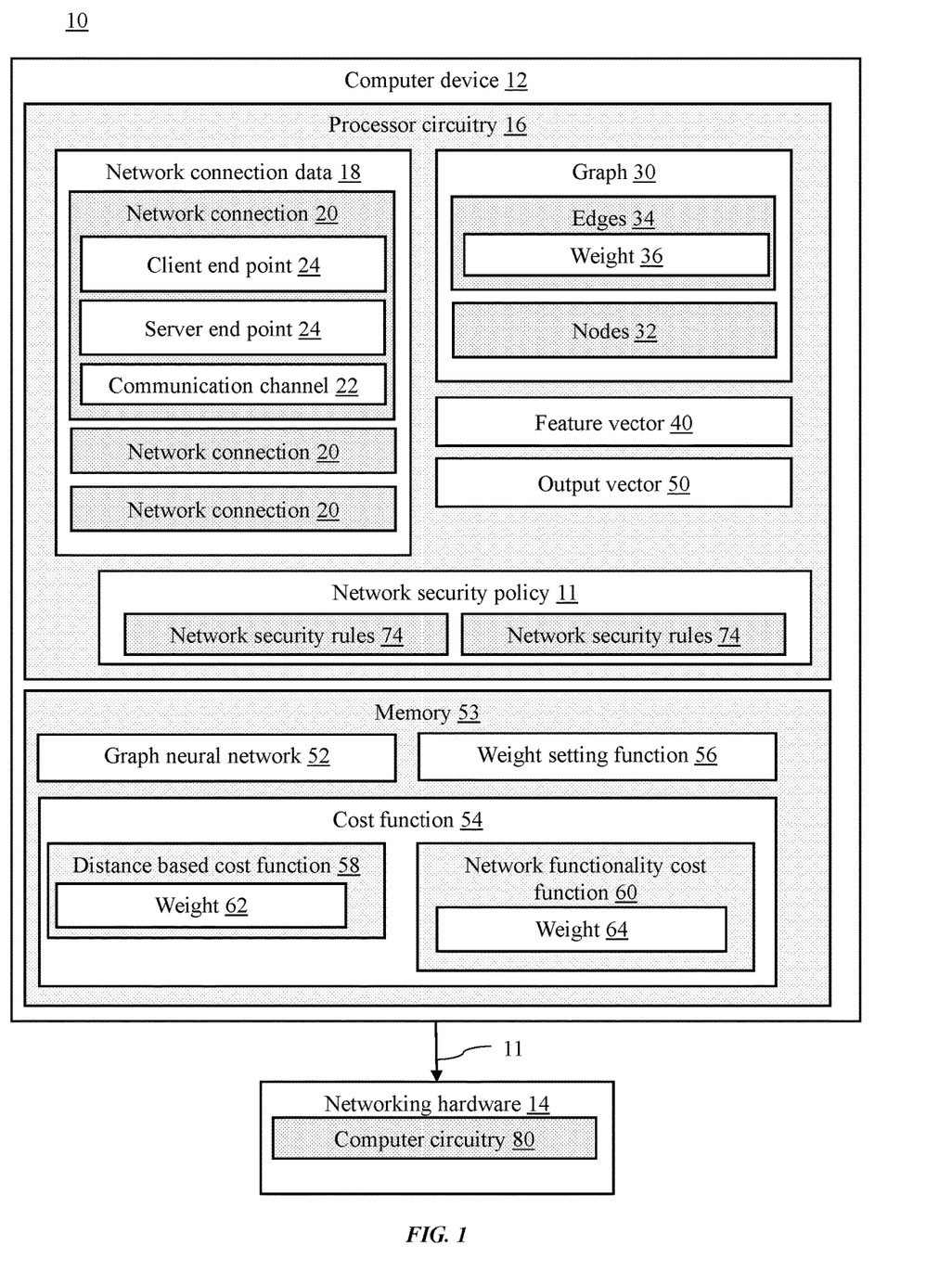
FIG. 1 is a block diagram of an embodiment of a system for automatically generating and applying a network security policy based on network traffic.

According to a general embodiment shown in FIG. 1, a system 10 is provided for automatically generating and applying a network security policy 11 based on network traffic. The system 10 includes a computer device 12 and networking hardware 14. Generally, the computer device 12 analyzes the network traffic to generate the network security policy 11 and sends the network security policy 11 to the networking hardware 14. The networking hardware 14 routes the network traffic and implements the network security policy 11.

The computer device 12 includes processor circuitry 16 for receiving network connection data 18 for network connections 20 in the network traffic. Each network connection 20 is on a communication channel 22 between two end points 24. For example, each communication channel may represent one or more of a port, application type (e.g., Skype, Teams, etc.), URL or part of a URL (e.g. scheme:// hostname scheme://hostname/path), etc. The network connection data 18 may be received from any suitable source or sources. For example, the network connection data 18 (or a part of the network connection data 18) may be received from the networking hardware 14.

Figure 2:
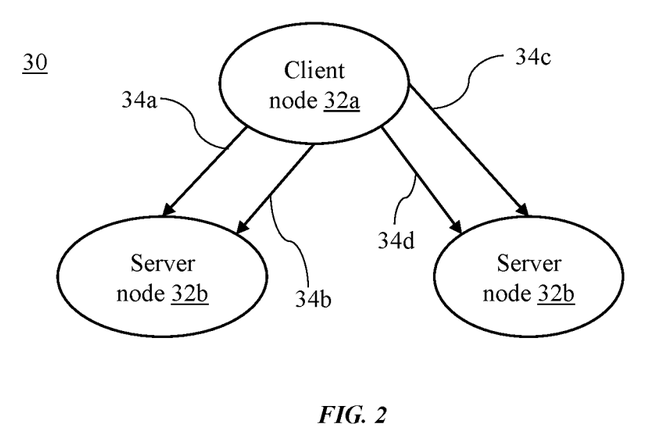
FIG. 2 is a block diagram of a portion of a graph showing server and client nodes.
Figure 3:
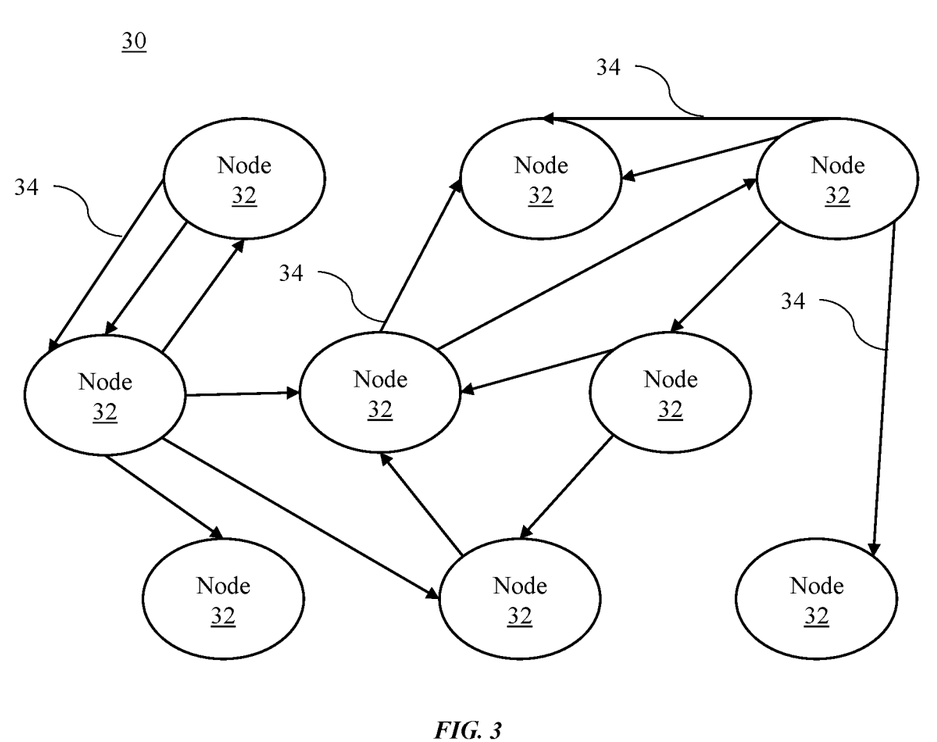
FIG. 3 is a block diagram of a graph showing nodes and edges representing network traffic.

With exemplary reference to FIGS. 2 and 3, the processor circuitry 16 generates a graph 30 based on the received network connection data 18. That is, the generated graph 30 represents communications between the different network end points. To generate the graph 30, the processor circuitry 16 identifies nodes 32 in the graph 30. Each node 32 represents an end point 24 of a network connection 20 in the network connection data 18. For example, each node 32 in the graph 30 may represent at least one of an internet protocol (IP) address, a user identifier, or an application identifier.

The processor circuitry 16 also generates edges 34 between the identified nodes 32. As shown in FIG. 2, each edge 34 is directional and connects a client node 32a and a server node 32b. That is, each edge 34 represents communication on a communication channel 22 from the client node 32a to the server node 32b. The processor circuitry 16 may also apply weights 36 to the edges 34. The weight 36 of each of the edges may be based on a number of network connections 20 from the client node 32a to the server node 32b on the communication channel 22 represented by the edge 34. The weight 36 may additionally or alternatively be modified by applying different weights to internal connections, to predetermined machines, etc.

Because each edge represents directional communication between a client node 32a and a server node 32b on a communication channel 22, there may be multiple edges connecting two nodes. For example, in FIG. 2, the client node 32a has two edges 34a, 34b (representing communication on two different communication channels) with left server node 32b. Similarly, the client node 32a also has two edges 34c, 34d (representing communication on two different communication channels) with the right server node 32b. FIG. 3 represents network communication between a greater number of network end points (i.e., nodes 32), with the nodes 32 having multiple edges 34 connecting between the nodes.

After generating the graph 30, the processor circuitry 16 generates a feature vector 40 for each of the nodes 32 in the graph 30. The feature vector 40 may include any suitable information for representing network communication for the node represented by the feature vector 40. For example, each feature vector 40 may include a representation of an internet protocol (IP) address of the node 32, a representation of network connections with the node on multiple predetermined communication channels, and a collective representation of network connections with the node on other communication channels (e.g., communication channels other than the multiple predetermined communication channels).

The multiple predetermined communication channels may comprise a list of the most commonly used communication channels. For example, the multiple predetermined communication channels may comprise a list of at least 3,000 of the most popularly used ports, such as TCP/22 (SSH), TCP/53 and UDP/53 (DNS), TCP/80 (HTTP), TCP/443 (HTTPS). The multiple predetermined communication channels may be chosen based on an analysis of the network connection data or in any suitable manner.

For each communication channel 22 of the multiple predetermined communication channels, a representation of the communication channel is included in the feature vector 40 based on the edges extending towards the node on the communication channel 22 and the edges extending from the node on the communication channel 22. For example, for each edge 34 extending from the node as the client node 32a, the feature vector 40 may include a representation of (1) the weight 36 of the edge 34 and (2) the server node 32b of the edge 34. Similarly, for each edge 34 extending to the node 32 as the server node 32b, the feature vector 40 may include a representation of (1) the weight 36 of the edge 34 and (2) the client node 32a of the edge 34.

Regarding the other communication channels not included in the predetermined communication channels, the feature vector 40 may include a representation of the other communication channels based on the weight 36 of the edges 34 extending from the node 32 as the communication channel on any of the other communication channels. That is, instead of including a representation of every communication channel 22 individually, the feature vector 40 may group together network connections to communication channels not included in the predetermined communication channels. For example, these other communication channels may be considered less important in determining the network security policy 11 than the predetermined communication channels. For this reason, these other communication channels may be consolidated together in the feature vector 40. For example, the representation of the other communication channels in the feature vector 40 may be determined based on a summation of the weights 36 of edges 34 for the other communication channels.

As described above, the feature vector 40 may include any additional information for categorizing network connections. For example, the feature vector 40 may include Boolean values identifying client nodes 32a and server nodes 32b as internal or external IP addresses. The feature vector 40 may also include information identifying a type of machine represented by a node 32. For example, the feature vector 40 may identify a node as a Kubernetes container, a server, a personal computer, a mobile device, etc.

After generating the graph 30, the processor circuitry 16 may generate a node embedding comprising an output vector 50 for each of the nodes 32 of the graph 30 by applying a graph neural network 52 to the feature vectors 40. The graph neural network 52 may be any suitable graph neural network, such as a graph attention network. The computer device 12 may include memory 53 (e.g., a non-transitory computer readable medium) for storing the graph neural network 52.

The graph neural network 52 has been trained to generate the node embedding using a cost function 54 modified by a weight setting function 56. The cost function 54 includes a distance-based cost function 58 and a network functionality cost function 60. The weight setting function 56 modifies a weight 62 applied to the distance-based cost function 58 and a weight 64 applied to the network functionality cost function 60. For example, the cost function 54 may be a summation of the distance-based cost function 58 multiplied by the weight 62 and the network functionality cost function 60 multiplied by the weight 64.

The distance-based cost function 58 is configured to group together in space (e.g., Euclidian space) the output vectors 50 for nodes 32 that are connected by an edge 34. The distance-based cost function 58 similarly pushes apart in space the output vectors 50 for nodes 32 that are not connected by an edge 34.

The network functionality cost function 60 groups together in space the output vectors 50 for nodes 32 based on a number of similar edges. A similar edge is an edge 34 having a same communication channel but may connect different nodes. That is, the network functionality cost function 60 pulls together in space output vectors 50 having more similar edges while pushing apart in space the output vectors 50 having fewer similar edges.

The weight setting function 56 first sets the weight 62 applied to the distance-based cost function 58 to a higher weight than the weight 64 of the network functionality cost function 60. The weight setting function 56 later sets the weight 62 applied to the distance-based cost function 58 to a lower weight than the weight 64 of the network functionality cost function 60. For example, training of the graph neural network 52 may initially be controlled primarily by the distance-based cost function 58 by setting the weight 62 of the distance-based cost function 58 higher than the weight 64 of the network functionality cost function 60. The weights 62, 64 may then be adjusted by the cost function 54, such that later training of the graph neural network 52 is primarily controlled by the network functionality cost function 60.

The weight setting function 56 may modify the weights 62, 64 in any suitable manner. For example, the weight setting function 56 may non-linearly vary the weight 62 applied to the distance-based cost function 58 and the weight 64 applied to the network functionality cost function 60 based on a distance between the output vectors in space.

As an example, at a beginning of training for a pair of points, a weight of one may be applied to the distance-based cost function 58 and a weight of zero may be applied to the network functionality cost function is zero 60. That is, the cost function 54 may only take into account the distance-based cost function at first. At a later time (e.g., once a distance between the output vectors 50 has been decreased below a threshold), a weight of zero may be applied to the distance-based cost function 58 and a weight of one may be applied to the network functionality cost function 60. That is, the cost function 54 may only take into account the network functionality cost function 60.

After generating the node embedding, the processor circuitry 16 generates the network security policy 11 from the generated output vectors 50. In particular, the processor circuitry 16 generates the network security policy 11 by identifying clusters in the output vectors 50. The processor circuitry 16 then generates network security rules 74 for each of the identified clusters. The security rules 74 are generated so that the network connections 20 included in the network connection data 18 involving the nodes 32 included in the cluster are permitted by the network security rules 74 for the nodes 32 included in the cluster. That is, the network security rules 74 allow the nodes 32 in the cluster to perform the network connections 20 included in the network connection data 18 for the nodes 32 in the cluster. As an example, if one of the nodes 32 in a cluster included a network connection 20 with an IP address for a DNS server on port 53, then the network security rules 74 would permit all of the nodes 32 in the cluster to communicate over port 53 with the DNS server at the IP address. Similarly, if one of the nodes 32 in a cluster included a network connection 20 with a URL for a server, then the network security rules may permit all of the nodes 32 in the cluster to communicate with the URL.

The processor circuitry 16 may also generate the network security policy 11 such that, for each cluster, any network connections 20 not included in the network connection data 18 involving the nodes included in the cluster are blocked by the network security rules for the nodes included in the cluster. For example, if no nodes in a cluster connected on port 8080 to a particular server in the network connection data 18, then the network security rules for the cluster may block connections to the particular server on port 8080.

When generating the network security rules 74, the processor circuitry 16 may analyze inbound traffic and outbound traffic to each node. For each cluster, the processor circuitry 16 may aggregate the inbound traffic for nodes 32 in the cluster based on communication channel and source. For example, the processor circuitry 16 may aggregate traffic for a cluster by defining a range of IP addresses for a communication channel for incoming connections in a network security rule 74. Similarly, for each cluster, the process circuitry 16 may similarly aggregate outbound traffic for each node in the cluster based on communication channel and destination. Continuing the above example, the processor circuitry 16 may aggregate traffic for a cluster by defining a range of IP addresses and range of ports for outgoing connections in a network security rule 74. Similarly, the processor circuitry 16 may aggregate traffic for a cluster by defining a range of IP addresses and range of ports for incoming connections in a network security rule 74.

The processor circuitry 16 combines the network security rules 74 to form the network security policy 11 and outputs the generated network security policy 11. For example, the processor circuitry 16 may transmit the network security policy 11 to the networking hardware 14. The network security policy 11 may be applied in a public cloud environment (e.g. Amazon Web Services, Microsoft Azure, Google Cloud Platform). For example, the network security policy 11 could be used to configure the public cloud native security controls of such cloud provides such as network ACLs, security groups and or WAF (Web Application Firewall).

The networking hardware 14 may implement the network security policy 11 generated by the computer device 12. That is, the networking hardware 14 applies the received network security policy 11 to the network connections 20. The networking hardware 14 includes computer circuitry 80 for routing network connections 20 between network end points. For example, the networking hardware 14 may be a firewall, network switch, network router, or other similar hardware for implementing the network security policy and for routing network traffic. The computer circuitry 80 may log the network traffic as network connection data 18 and send the logged network connection data 18 to the computer device 12.

As described above, the network connection data 18 may be received from one or more sources. For example, the network connection data 18 may be determined by receiving network traffic logs from various sources and by deduplicating network connections containing in the network traffic logs (e.g., if the same network traffic is recorded in different logs, the network traffic may be deduplicated and correlated to ensure the same network traffic is not included multiple times in the network connection data 18). As an example, the network traffic logs could be generated by intermediate networking devices and/or the network endpoints. When generated by the network endpoints, the network connection data could be generated by agents running on the endpoint by the application generating the network traffic, such as a web client or server or a browser extension.

The processor circuitry 16 and computer circuitry 80 may have various implementations. For example, the processor circuitry 16 and computer circuitry 80 may include any suitable device, such as a processor (e.g., CPU), programmable circuit, integrated circuit, memory and I/O circuits, an application specific integrated circuit, microcontroller, complex programmable logic device, other programmable circuits, or the like. The processor circuitry 16 and computer circuitry 80 may be located on one or more discrete and separate pieces of hardware. The processor circuitry 16 and computer circuitry 80 may also include a non-transitory computer readable medium, such as random-access memory (RAM), a read-only memory (ROM), an erasable programmable read-only memory (EPROM or Flash memory), or any other suitable medium. Instructions for performing the method described below may be stored in the non-transitory computer readable medium and executed by the processor circuitry 16 and computer circuitry 80. The processor circuitry 16 and computer circuitry 80 may be communicatively coupled to the computer readable medium and communication interface through a system bus, mother board, or using any other suitable structure known in the art.

The memory 53 may be any suitable computer readable medium, such as one or more of a buffer, a flash memory, a hard drive, a removable media, a volatile memory, a non-volatile memory, a random-access memory (RAM), or other suitable device. In a typical arrangement, the memory 53 may include a non-volatile memory for long term data storage and a volatile memory that functions as system memory for the processor 16. The memory may exchange data with the processor circuitry 16 over a data bus. Accompanying control lines and an address bus between the memory 53 and the processor circuitry 16, 80 also may be present. The memory 53 is considered a non-transitory computer readable medium.

Figure 4:
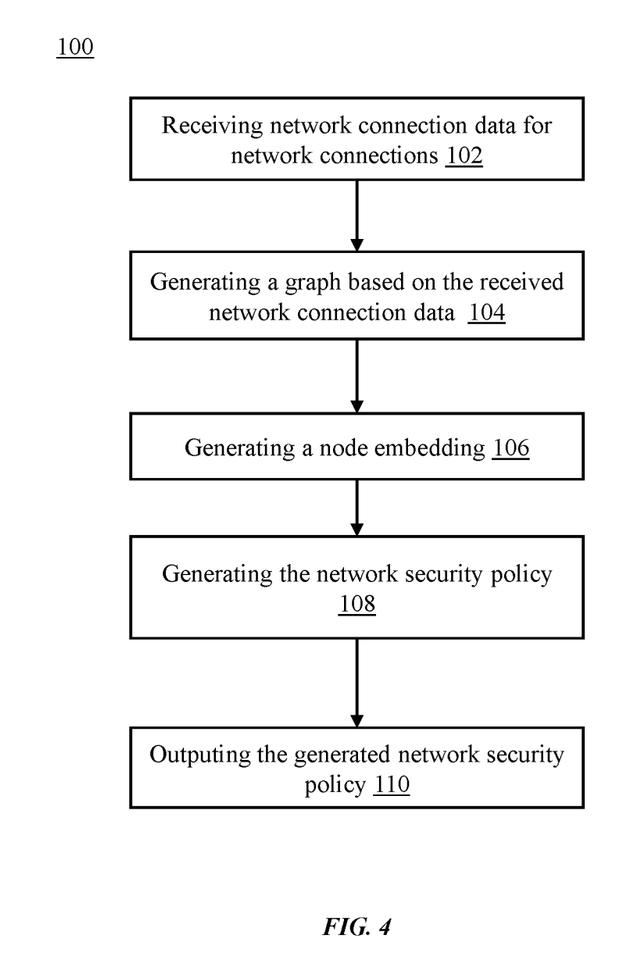
FIG. 4 is a flow diagram of an embodiment of a method for generating a network security policy automatically using processor circuitry based on network traffic.

In the embodiment depicted in FIG. 4, a method 100 implemented by the processor circuitry 16 is shown for generating a network security policy automatically using processor circuitry based on network traffic. In step 102, the processor circuitry receives network connection data for network connections in the network traffic. In step 104, the processor circuitry generates a graph based on the received network connection data. As described above, generating the graph includes identifying nodes in the graph; generating edges between the identified nodes; and, for each of the nodes in the graph, generating a feature vector.

In step 106, the processor circuitry generates a node embedding comprising an output vector for each of the nodes of the graph by applying a graph neural network to the feature vectors of the nodes in the graph. In step 108, the processor circuitry generates the network security policy. As described above, generating the network security policy includes identifying clusters in the output vectors of the generated node embedding; generating network security rules for each of the identified clusters; and combining the network security rules to form the network security policy. In step 110, the processor circuitry outputs the generated network security policy.

Implementation of the method and/or system of embodiments of the invention can involve performing or completing selected tasks manually, automatically, or a combination thereof. Moreover, according to actual instrumentation and equipment of embodiments of the method and/or system of the invention, several selected tasks could be implemented by hardware, by software or by firmware or by a combination thereof using an operating system.

For example, hardware for performing selected tasks according to embodiments of the invention could be implemented as a chip or a circuit. As software, selected tasks according to embodiments of the invention could be implemented as a plurality of software instructions being executed by a computer using any suitable operating system. In an exemplary embodiment of the invention, one or more tasks according to exemplary embodiments of method and/or system as described herein are performed by a data processor, such as a computing platform for executing a plurality of instructions. Optionally, the data processor includes a volatile memory for storing instructions and/or data and/or a non-volatile storage, for example, non-transitory storage media such as a magnetic hard-disk and/or removable media, for storing instructions and/or data. Optionally, a network connection is provided as well. A display and/or a user input device such as a keyboard or mouse are optionally provided as well.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The above-described processes including portions thereof can be performed by software, hardware, and combinations thereof. These processes and portions thereof can be performed by computers, computer-type devices, workstations, processors, micro-processors, other electronic searching tools and memory and other non-transitory storage-type devices associated therewith. The processes and portions thereof can also be embodied in programmable non-transitory storage media, for example, compact discs (CDs) or other discs including magnetic, optical, etc., readable by a machine or the like, or other computer usable storage media, including magnetic, optical, or semiconductor storage, or other source of electronic signals.

All ranges and ratio limits disclosed in the specification and claims may be combined in any manner. Unless specifically stated otherwise, references to "a," "an," and/or "the" may include one or more than one, and that reference to an item in the singular may also include the item in the plural.

Although the invention has been shown and described with respect to a certain embodiment or embodiments, equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

The invention claimed is:

1. A computer device for generating a network security policy automatically based on network traffic comprising:
  processor circuitry configured to:
    receive network connection data for network connections in the network traffic, wherein each network connection is on a communication channel between two end points;
    generate a graph based on the received network connection data comprising:

identifying nodes in the graph, wherein each node in the graph comprises an end point of a network connection in the network connection data;
generating edges between the identified nodes, wherein each edge of the generated edges:
  is directional and connects a client node and a server node; and
  represents communication on a communication channel from the client node to the server node;
for each of the nodes in the graph, generating a feature vector including:
  an identifier of the node; and
  for each communication channel of multiple predetermined communication channels, a representation of the communication channel based on:
    the server node of each of the edges extending from the node as the client node on the communication channel;
    the client node of each of the edges extending to the node as the server node on the communication channel; and
    a collective representation of other communication channels not included in the predetermined communication channels;
generating a node embedding comprising an output vector for each of the nodes of the graph by applying a graph neural network to the feature vectors of the nodes in the graph, wherein:
  the graph neural network is trained using a cost function modified by a weight setting function;
  the cost function includes a distance-based cost function and a network functionality cost function;
  the weight setting function is configured to modify a weight applied to the distance-based cost function and a weight applied to the network functionality cost function, such that:
    a higher weight is first applied to the distance-based cost function than the network functionality cost function; and
    a higher weight is later applied to the network functionality cost function than the distance-based cost function;
  the distance-based cost function is configured to:
    group together in space the output vectors for nodes that are connected by an edge; and
    push apart in space the output vectors for nodes not connected by an edge; and
  the network functionality cost function is configured to group together in space the output vectors for nodes based on a number of similar edges, such that:
    the output vectors for nodes having more similar edges are pulled together in space while the output vectors for nodes having fewer similar edges are pushed apart in space,
    wherein a similar edge is an edge having a same server node or a same client node;
generating the network security policy comprising:
  identifying clusters in the output vectors of the generated node embedding;
  generating network security rules for each of the identified clusters, such that the network connections included in the network connection data involving the nodes included in the cluster are permitted by the network security rules for the nodes included in the cluster; and
  combining the network security rules to form the network security policy; and
outputting the generated network security policy.

2. The computer device of claim 1, wherein each node in the graph represents at least one of an internet protocol (IP) address, a user identifier, or an application identifier.

3. The computer device of claim 1, wherein the communication channel for each network connection represents one or more of a port, application type, URL, or part of a URL.

4. The computer device of claim 1, wherein:
the generating of the graph based on the received network connection data further comprises:
  applying weights to the generated edges, such that each of the generated edges has a weight based on a number of network connections in the network connection data from the client node to the server node on the communication channel represented by the edge;
the representation of the communication channel is also based on:
  the weight of each of the edges extending from the node as the client node on the communication channel; and
  the weight of each of the edges extending to the node as the server node on the communication channel; and
the collective representation of other communication channels not included in the predetermined communication channels is based on the weight of the edges extending from the node as the communication channel on any of the other communication channels.

5. The computer device of claim 1, wherein the graph neural network is a graph attention network.

6. The computer device of claim 1, wherein the weight setting function is configured to non-linearly vary the weight applied to the distance-based cost function and the weight applied to the network functionality cost function based on a distance between the output vectors.

7. The computer device of claim 1, wherein:
the weight first applied to the distance-based cost function is one and the weight first applied to the network functionality cost function is zero; and
the weight later applied to the distance-based cost function is zero and the weight later applied to the network functionality cost function is one.

8. The computer device of claim 1, wherein the network security policy for each of the identified clusters is generated, such that any network connections not included in the network connection data involving the nodes included in the cluster are blocked by the network security rules for the nodes included in the cluster.

9. A system for automatically generating and applying a network security policy based on network traffic comprising:
a computer device including processor circuitry configured to:
  receive network connection data for network connections in the network traffic, wherein each network connection is on a communication channel between two end points;
  generate a graph based on the received network connection data comprising:
    identifying nodes in the graph, wherein each node in the graph comprises an end point of a network connection in the network connection data;

generating edges between the identified nodes, wherein each edge of the generated edges:
is directional and connects a client node and a server node; and
represents communication on a communication channel from the client node to the server node;
for each of the nodes in the graph, generating a feature vector including:
an identifier of the node; and
for each communication channel of multiple predetermined communication channels, a representation of the communication channel based on:
the server node of each of the edges extending from the node as the client node on the communication channel;
the client node of each of the edges extending to the node as the server node on the communication channel; and
a collective representation of other communication channels not included in the predetermined communication channels;
generating a node embedding comprising an output vector for each of the nodes of the graph by applying a graph neural network to the feature vectors of the nodes in the graph, wherein:
the graph neural network is trained using a cost function modified by a weight setting function;
the cost function includes a distance-based cost function and a network functionality cost function;
the weight setting function is configured to modify a weight applied to the distance-based cost function and a weight applied to the network functionality cost function, such that:
a higher weight is first applied to the distance-based cost function than the network functionality cost function; and
a higher weight is later applied to the network functionality cost function than the distance-based cost function;
the distance-based cost function is configured to:
group together in space the output vectors for nodes that are connected by an edge; and
push apart in space the output vectors for nodes not connected by an edge; and
the network functionality cost function is configured to group together in space the output vectors for nodes based on a number of similar edges, such that:
the output vectors for nodes having more similar edges are pulled together in space while the output vectors for nodes having fewer similar edges are pushed apart in space,
wherein a similar edge is an edge having a same server node or a same client node;
generating the network security policy comprising:
identifying clusters in the output vectors of the generated node embedding;
generating network security rules for each of the identified clusters, such that the network connections included in the network connection data involving the nodes included in the cluster are permitted by the network security rules for the nodes included in the cluster; and
combining the network security rules to form the network security policy; and outputting the generated network security policy networking hardware including computer circuitry configured to:
route the network connections included in the network traffic between the two end points on the communication channel;
log the network traffic as the network connection data;
send the logged network connection data to the computer device;
receive the generated network security policy; and
apply the received network security policy to the network connections.

10. The system of claim 9 wherein each node in the graph represents at least one of an internet protocol (IP) address, a user identifier, or an application identifier.

11. The system of claim 9, wherein the communication channel for each network connection represents one or more of a port, application type, URL, or part of a URL.

12. The system of claim 9, wherein:
the generating of the graph based on the received network connection data further comprises:
applying weights to the generated edges, such that each of the generated edges has a weight based on a number of network connections in the network connection data from the server node to the client node on the communication channel represented by the edge;
the representation of the communication channel is also based on:
the weight of each of the edges extending from the node as the client node on the communication channel; and
the weight of each of the edges extending to the node as the server node on the communication channel; and
the collective representation of other communication channels not included in the predetermined communication channels is based on the weight of the edges extending from the node as the communication channel on any of the other communication channels.

13. The system of claim 9, wherein the weight setting function is configured to non-linearly vary the weight applied to the distance-based cost function and the weight applied to the network functionality cost function based on a distance between the output vectors.

14. The system of claim 9, wherein:
the weight first applied to the distance-based cost function is one and the weight first applied to the network functionality cost function is zero; and
the weight later applied to the distance-based cost function is zero and the weight later applied to the network functionality cost function is one.

15. The system of claim 9, wherein the network security policy for each of the identified clusters is generated, such that any network connections not included in the network connection data involving the nodes included in the cluster are blocked by the network security rules for the nodes included in the cluster.

16. A method for generating a network security policy automatically using processor circuitry based on network traffic comprising:
receiving with the processor circuitry network connection data for network connections in the network traffic, wherein each network connection is on a communication channel between two end points;
generating with the processor circuitry a graph based on the received network connection data comprising:

identifying nodes in the graph, wherein each node in the graph comprises an end point of a network connection in the network connection data;
generating edges between the identified nodes, wherein each edge of the generated edges:
is directional and connects a client node and a server node; and
represents communication on a communication channel from the client node to the server node;
for each of the nodes in the graph, generating a feature vector including:
an identifier of the node; and
for each communication channel of multiple predetermined communication channels, a representation of the communication channel based on:
the server node of each of the edges extending from the node as the client node on the communication channel;
the client node of each of the edges extending to the node as the server node on the communication channel; and
a collective representation of other communication channels not included in the predetermined communication channels;
generating with the processor circuitry a node embedding comprising an output vector for each of the nodes of the graph by applying a graph neural network to the feature vectors of the nodes in the graph, wherein:
the graph neural network is trained using a cost function modified by a weight setting function;
the cost function includes a distance-based cost function and a network functionality cost function;
the weight setting function is configured to modify a weight applied to the distance-based cost function and a weight applied to the network functionality cost function, such that:
a higher weight is first applied to the distance-based cost function than the network functionality cost function; and
a higher weight is later applied to the network functionality cost function than the distance-based cost function;
the distance-based cost function is configured to:
group together in space the output vectors for nodes that are connected by an edge; and
push apart in space the output vectors for nodes not connected by an edge; and
the network functionality cost function is configured to group together in space the output vectors for nodes based on a number of similar edges, such that:
the output vectors for nodes having more similar edges are pulled together in space while the output vectors for nodes having fewer similar edges are pushed apart in space,
wherein a similar edge is an edge having a same server node or a same client node;
generating with the processor circuitry the network security policy comprising:
identifying clusters in the output vectors of the generated node embedding;
generating network security rules for each of the identified clusters, such that the network connections included in the network connection data involving the nodes included in the cluster are permitted by the network security rules for the nodes included in the cluster; and
combining the network security rules to form the network security policy; and
outputting with the processor circuitry the generated network security policy.

17. The method of claim 16, further comprising applying the network security policy to network connections.

18. The method of claim 16, wherein:
the generating of the graph based on the received network connection data further comprises:
applying weights to the generated edges, such that each of the generated edges has a weight based on a number of network connections in the network connection data from the client node to the server node on the communication channel represented by the edge;
the representation of the communication channel is also based on:
the weight of each of the edges extending from the node as the client node on the communication channel; and
the weight of each of the edges extending to the node as the server node on the communication channel; and
the collective representation of other communication channels not included in the predetermined communication channels is based on the weight of the edges extending from the node as the communication channel on any of the other communication channels.

19. The method of claim 16, wherein the weight setting function is configured to non-linearly vary the weight applied to the distance-based cost function and the weight applied to the network functionality cost function based on a distance between the output vectors.

20. The method of claim 16, wherein:
the weight first applied to the distance-based cost function is one and the weight first applied to the network functionality cost function is zero; and
the weight later applied to the distance-based cost function is zero and the weight later applied to the network functionality cost function is one.

* * * * *